Figure 1:
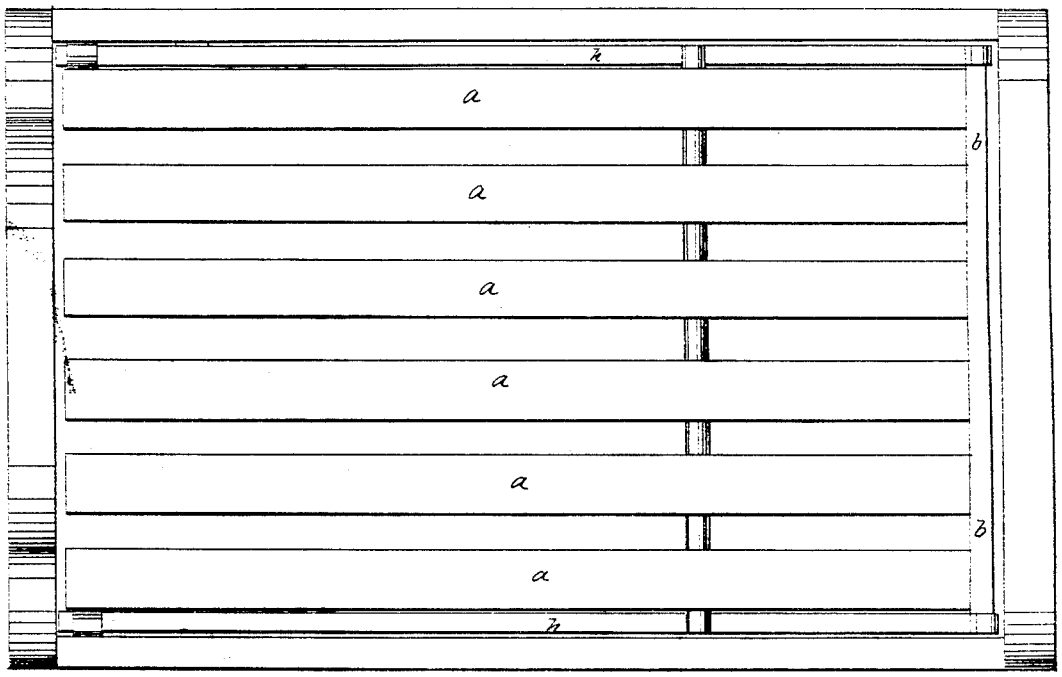
Figure 3:
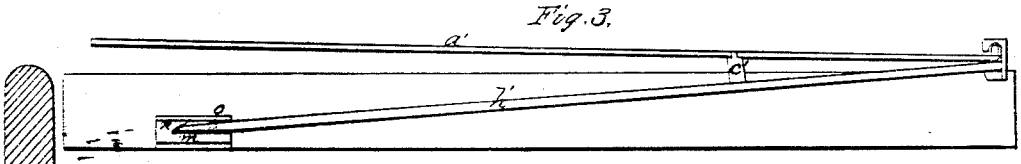
Figure 4:
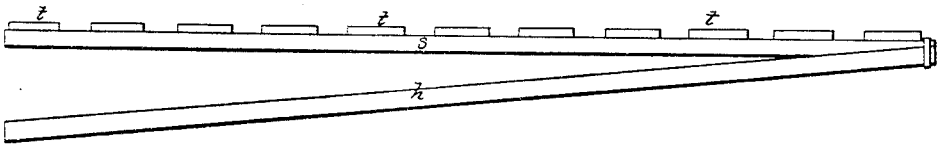
Figure 2:
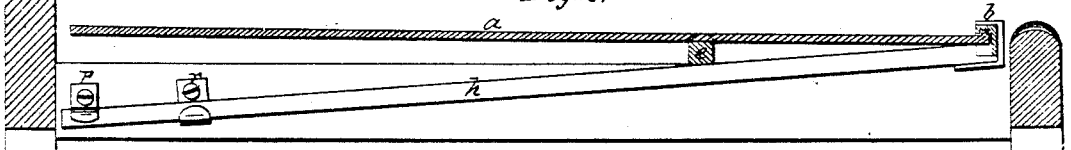

BEST AVAILABLE COPY

H. T. Smith,

Bed Bottom,

A. 1. No. 220. A. I. Feb. 22, 1859.

Witnesses.
H. Southgate Smith
J. Tyburski

Inventor
Henry T. Smith

J. PETERS, PHOTO-LITHOGRAPHER, WASHINGTON, D. C.